United States Patent [19]
Silver et al.

[11] 3,721,604
[45] March 20, 1973

[54] CONTINUOUS CULTIVATION OF HYDROCARBON-CONSUMING MICROORGANISMS

[75] Inventors: Richard S. Silver, Monroeville, Pa.; Joel K. Wong, Bakersfield, Calif.

[73] Assignee: Gulf Research & Development Company, Pittsburgh, Pa.

[22] Filed: Nov. 4, 1971

[21] Appl. No.: 195,827

Related U.S. Application Data

[63] Continuation-in-part of Ser. No. 883,583, Dec. 9, 1969, abandoned.

[52] U.S. Cl. .................................................195/28 R
[51] Int. Cl. ...........................C12b 1/00, A23j 1/18
[58] Field of Search .......195/28 R, 3 H, 82, 114, 115

[56] References Cited

UNITED STATES PATENTS

| | | | |
|---|---|---|---|
| 2,697,061 | 12/1954 | Harris et al. | 195/3 H |
| 2,697,062 | 12/1954 | Cramer | 195/3 H |
| 3,015,612 | 2/1962 | Pirt | 195/115 |
| 3,164,531 | 1/1965 | Okada et al. | 195/114 |
| 3,201,327 | 8/1965 | Beek | 195/28 R |
| 3,222,258 | 12/1965 | Iizuka | 195/3 H |
| 3,264,196 | 8/1966 | Filosa | 195/3 H |
| 3,293,145 | 12/1966 | Leavitt et al. | 195/28 R |
| 3,361,643 | 1/1968 | Fukushima et al. | 195/114 |
| 3,483,088 | 12/1969 | Seeley | 195/114 |
| 3,511,752 | 5/1970 | Tanaka et al. | 195/28 R |

*Primary Examiner*—Lionel M. Shapiro
*Assistant Examiner*—R. B. Penland
*Attorney*—Meyer Neishloss et al.

[57] ABSTRACT

A process for cultivating a hydrocarbon-consuming micro-organism includes the following steps:

1. A culture medium consisting of aqueous nutrient medium, surface active agent and hydrocarbon is seeded with a low cell concentration of a hydrocarbon-consuming micro-organism.

2. Aerobic culturing of the micro-organism is initiated and continued until essentially equilibrium conditions are reached in the logarithmic growth phase.

3. Continuous culturing is initiated and continued under aerobic conditions in the presence of aqueous nutrient medium and hydrocarbon in the absence of added surface active agent.

17 Claims, No Drawings

CONTINUOUS CULTIVATION OF HYDROCARBON-CONSUMING MICRO-ORGANISMS

This application is a continuation-in-part of our copending application Ser. No. 883,583 filed Dec. 9, 1969 now abandoned.

This invention relates to a process for cultivating micro-organisms on hydrocarbons and more particularly to a process wherein propagation of the micro-organism is initiated in the presence of a surface active agent followed by cultivation in the absence of a surface active agent.

Critical food shortages for both animals and humans in some parts of the world is a problem of growing concern. The use of fertilizers and improved farming techniques have greatly increased crop return per acre of cultivated ground. While increased crop yields has resulted in more food for more people throughout the world, there are still an alarming number of people who are suffering from malnutrition. To alleviate malnutrition, protein and vitamin food supplements have been developed for both animal and human consumption. Protein concentrates for food supplements that are commercially available include fish meal, peanut meal, cottonseed meal, soybean meal and micro-organisms such as bacteria, molds, yeasts and the like.

Micro-organisms, because of their high rate of multiplication, have received much attention as a source of high quality protein. The ability of micro-organisms to metabolize carbohydrates is well-known. It is equally well-known, however, that carbohydrates are relatively expensive raw materials if the desired end product is a relatively inexpensive micro-organism. Because of the abundance of relatively inexpensive crude oil deposits, a considerable amount of experimental work has been conducted utilizing hydrocarbons derived from petroleum as the sole source of carbon for the growth of micro-organisms. A number of micro-organisms have been found to grow on petroleum substrates varying from normally gaseous hydrocarbons through normally liquid hydrocarbons and hydrocarbons that are solid under normal atmospheric conditions. One difficulty frequently encountered in continuously cultivating a micro-organism on a petroleum hydrocarbon or mixture of hydrocarbons is the relatively low cell concentration in the fermentation mass (brew) which is continuously removed from the fermenter. Inasmuch as the cell concentration in the brew often remains essentially the same or decreases when continuous culturing is initiated at the termination of the logarithmic phase of batch culture, it is desirable to obtain a high cell concentration at the beginning of the continuous process. A high cell concentration at the beginning of a continuous process results in a high cell concentration in the effluent brew from the process. A high cell concentration at the end of the process results in easier product separating procedures and improved yields. The net result is an economically attractive process.

In accordance with the present invention, a continuous process is provided for cultivating a hydrocarbon-consuming micro-organism wherein the propagation of the micro-organism is initiated by introducing the micro-organism at a low cell concentration at an active fermentation temperature into a micro-organism growth-supporting mixture comprising an aqueous nutrient medium, a surface active agent, a hydrocarbon and a gas containing free oxygen. The hydrocarbon-consuming micro-organism in the growth-supporting mixture is cultivated until the cell concentration of the micro-organism in the fermentation mass reaches a maximum under logarithmic growth. Thereafter, continuous cultivation of the hydrocarbon-consuming micro-organism is conducted in the presence of an aqueous nutrient medium, a hydrocarbon and a gas containing free oxygen in the absence of added surface active agent. We have found that when the cell concentration reaches a maximum under logarithmic growth with the aid of a surface active agent, the continued use of a surface active agent is no longer necessary. The cell concentration once it reaches a maximum under logarithmic growth thereafter can be maintained the same whether or not additional surface active agent is employed. For economic reasons, it is desirable to eliminate the use of a surface active agent as soon as possible. In the present invention, surface active agent is utilized only in the start-up procedure. As soon as the cell concentration reaches a maximum under logarithmic growth, the process thereafter operates continuously without further surface active agent being added. Aqueous nutrient medium, hydrocarbon feedstock and oxygen are added continuously while continuously removing an equal amount of a fraction of the brew containing a maximum amount of cells per unit volume of brew. The desired cells are thereafter recovered from the fraction containing them.

In the continuous cultivation process of the present invention, the composition of the nutrient medium and the number of cells in said medium, once the process has been initiated, is maintained substantially constant. The growth rate of the cells in the culture is also maintained essentially constant. The growth rate of the cells depends upon a number of factors including the composition of the nutrient medium, the pH of the medium, aeration, temperature, design of the equipment and the particular micro-organism employed. In the process of the present invention nutrient medium is continuously added at a constant volumetric ratio to a culture in a culture vessel which culture is homogeneously maintained with the nutrient medium and hydrocarbon feedstock and simultaneously therewith equal volumes of a fraction containing the culture are withdrawn from the culture vessel. Thereafter, the micro-organism is recovered from the fraction which is withdrawn. During the period the culture is in the culture vessel, growth occurs at a constant volume, under constant conditions of composition of the culture medium and with a constant number of cells in the culture medium. According to this process, equilibrium conditions are employed which can go on indefinitely provided the proper culture conditions are maintained. The ratio of rate of flow of the medium to the volume of culture in the culture vessel is largely responsible for the equilibrium conditions by imposing a controlled growth rate on the culture.

Micro-organisms which can be cultivated in the process of the invention are those which normally can assimilate carbon from hydrocarbons or those which have been adapted to assimilate carbon from hydrocarbons including molds, bacteria and yeasts. Typical examples of molds are those of the family Aspergillaceae, suitable genera of which are Penicillium and Aspergillus. Specific examples of molds within these genera are *Penicillium rocqueforti, Penicillium glaucum, Penicillium chrysogenum, Penicillium patulum, Penicillium notatum, Penicillium espansum, Aspergillus fumigatus, Aspergillus carbonarious, Aspergillus niger, Aspergillus flavus, Aspergillus terreus* and *Aspergillus versicolor*.

Bacteria which can be employed in the process of the invention are those within the group consisting of Pseudomonadales, Eubacteriales and Actinomycetales. The bacteria which are employed are preferably of the families Bacillaceae and Pseudonomadaceae, preferred species being *Bacillus megaterium, Bacillus subtilis* and *Pseudomonas aeruginosa*.

Yeasts which can be employed in the process of the invention are preferably those of the family Cryptococcaceae and especially of the sub-family Cryptococcoideae. Other yeasts can also be employed such as those of the family ascosporogeneous and especially of the sub-family Saccharomycoideae. Preferred genera of the Cryptococcoideae sub-family are Torulopsis and Candida. Preferred strains of yeast are *Candida utilis, Candida rugosa, Candida lipolytica, Candida tropicalis* and *Torulopsis colliculosa*. Of these yeasts, a strain of *Candida tropicalis* is preferred, particularly *Candida tropicalis*, strains CS–8–17 and CS–9–5 which are essentially identical strains which have been isolated from petroleum-soaked soils. *Candida tropicalis*, strains CS–8–17 and CS–9–5 have been deposited in the American Type Culture Collection in Rockville, Md. These strains have been assigned the ATCC numbers 20021 and 20326, respectively. The advantage of utilizing a micro-organism which has been isolated from an oil-soaked soil is that the organism is already adapted to metabolize hydrocarbons so that an initial hydrocarbon-adaptation procedure is not necessary. If the micro-organism, particularly yeast, has been grown in a carbohydrate environment, it is usually necessary to adapt the organism to grow on carbon supplied by the hydrocarbon. This procedure may require a prolonged period of time. Even yeasts which have been isolated from oil-soaked soil may require an adaptation procedure to adapt the yeast to grow on the particular hydrocarbon which is intended to be used as feedstock in the fermentation process.

The hydrocarbon which is utilized in the process of the invention is a saturated or unsaturated aliphatic hydrocarbon having up to 30 or more carbon atoms per molecule. A preferred hydrocarbon feedstock is a petroleum fraction, especially a petroleum fraction consisting essentially of a mixture of straight chain hydrocarbons. The straight chain hydrocarbons can be present as olefins, paraffins or a mixture containing both olefins and paraffins. Examples of individual hydrocarbons which can be used are n-pentane, 1-pentene, n-hexane, 1-hexene, n-heptane, 1-heptene, n-octane, n-decane, 1-decene, n-dodecane, 1-dodecene, n-tetradecane, 1-tetradecene, n-hexadecane, n-octadecane, n-eicosane, n-tetracosane, n-triacontane and the like. Those hydrocarbons which are liquid at the fermentation conditions employed are preferred. While the individual hydrocarbons can be used, we prefer, for economic reasons to use mixtures of hydrocarbons. Thus, we may use kerosene, gas oil, middle distillate fractions, slack wax and the like. Good results have been obtained with hydrocarbon mixtures comprising naphtha ($C_6$–$C_{13}$), n-paraffins ($C_9$–$C_{13}$), n-paraffins ($C_{14}$–$C_7$), alpha olefins ($C_{10}$–$C_{16}$), kerosene ($C_9$–$C_{16}$) and slack wax ($C_{17}$–$C_{29}$) alone and in admixture with naphtha. The amount of hydrocarbon employed is that amount required to provide sufficient carbon to support growth of the micro-organism during the fermentation period. The hydrocarbon is added continuously during the fermentation period in that amount required to effect the desired growth without any appreciable excess to avoid subsequent separation difficulties. In general, pure n-paraffins are added at a rate of about 2 to about 5 grams of paraffin per liter of the fermentation mass (brew) per hour. When a hydrocarbon mixture is employed, the mixture is added at a rate proportioned to the normal paraffin content, so that the amount of normal paraffin added is about 2 to about 5 grams of paraffin per liter of brew in the fermenter per hour.

Inasmuch as micro-organisms are made-up of living cells, their growth, as is true with other living organisms, depends upon an adequate supply of carbon, hydrogen, oxygen, nitrogen and trace amounts of other elements including sodium, potassium, magnesium and iron. Carbon is required for growth and energy. Nitrogen is required for synthesis of protein and other nitrogenous materials. Other elements are required for mineral structure of the cell. In the present process, carbon and hydrogen are supplied by the hydrocarbon; oxygen is supplied by the introduction of air; and nitrogen is supplied through the use of ammonium or other nitrogenous inorganic salts in the aqueous nutrient medium. Trace quantities of other elements necessary for growth of the micro-organism may be supplied as impurities in the inorganic salts or these elements may be added directly in extremely small amounts. Frequently, sufficient quantities of the trace elements are present in tap water.

The make-up of the aqueous nutrient medium employed in the process of the invention can vary to some extent depending upon the type of micro-organism used and the type of hydrocarbon. In general, the aqueous nutrient medium comprises a mixture of mineral salts which furnish ions of ammonium, nitrate or nitrite, potassium, ferrous or ferric, calcium, magnesium, phosphate, sulfate, as well as ions of trace elements including zinc, manganese, copper and molybdenum. Inasmuch as water is included in the nutrient mixture, many of the mineral salts can be incorporated into the substrate in sufficient quantity through the use of tap water. It is desirable, however, to add the salts to the mixture to insure their presence in sufficient quantity for growth of the micro-organism. The nutrient mixture consists primarily of water, which may constitute about 50 to 99 percent by weight or more of the total nutrient mixture. Generally, the water is employed in an amount normally used in microbial synthesis. In general the aqueous nutrient medium is added at a rate of about 0.10 to about 0.30 liter per liter of brew in the fermenter per hour, a preferred rate for most favorable growth of *Candida tropicalis* (CS–8–17) or (CS–9–5) being about 0.15 to about 0.25 liter per liter of brew per hour.

During the course of the growth of a hydrocarbon-assimilating micro-organism on a hydrocarbon substrate in the presence of an aqueous mineral nutrient medium and an oxygen containing gas, oxygen is absorbed and carbon dioxide is liberated, and acidic substances, principally fatty acids are formed. The net effect of these processes is a reduction of the pH of the aqueous nutrient medium. Thus, to prevent a build-up of acidity which adversely affects the growth of the micro-organism, it is essential to add an alkaline material to restore the pH of the aqueous nutrient medium to a desired level. If the pH is not maintained at a desired level, the growth of the micro-organism ceases, that is cellular density no longer increases so that a stationary growth phase is encountered.

The optimum pH of the aqueous nutrient medium depends somewhat upon the nature of the substrate and the particular micro-organism being cultured. The pH is usually within the range of about 1.5 to about 8. With mineral salts substrates, the optimum pH for most yeast cultures is a pH of about 7. When employing a yeast nitrogen base substrate, optimum growth for a yeast of the strain of Candida tropicalis occurs at a pH of about 3 to 5, a pH of about 3 being preferred. While optimum ranges of pH for molds is also within the range of about 3 to 5, bacteria usually requires a higher pH in the order of about 6 to 8. In order to maintain the pH at any desired level, we may add to the aqueous nutrient medium any suitable alkaline material such as sodium hydroxide, potassium hydroxide, disodium hydrogen phosphate, ammonium hydroxide and ammonia.

A medium typical of the type used for propagation of a strain of Candida tropicalis contains the following concentrations of macro-ions, micro-ions and the vitamin D-biotin.

| Macro-ions | PPM | Micro-ions | PPM | Others | PPM |
|---|---|---|---|---|---|
| N (as $NH_4^+$) | 140 | B | 0.175 | Biotin | 5 |
| $SO_4$ | 1143.5 | I | 0.153 | | |
| $PO_4$ | 2093.65 | Cu | 0.0536 | | |
| $NO_3$ | 95.2 | Zn | 0.5457 | | |
| Ca | 13.6 | Mn | 0.26 | | |
| Mg | 98.66 | Mo | 0.175 | | |
| Na | 19.67 | Co | 0.003 | | |
| K | 861.93 | Fe | 0.0826 | | |

Such a medium can be prepared by dissolving the following compounds in a quantity of distilled water such that the solution volume is equal to 1 liter

| | Grams |
|---|---|
| Potassium phosphate $KH_2PO_4$ | 3 |
| Magnesium sulfate $MgSO_4 \cdot 7H_2O$ | 1 |
| Sodium nitrate $NaNO_3$ | 0.07 |
| Calcium nitrate $Ca(NO_3)_2 \cdot 4H_2O$ | 0.08 |
| Ammonium sulfate $(NH_4)_2SO_4$ | 0.66 |
| Sulfuric acid, concentrated (93% $H_2SO_4$) | 0.291 |

| | Micrograms |
|---|---|
| D-Biotin | 5 |
| Copper Sulfate $CuSO_4 \cdot 5H_2O$ | 240 |
| Zinc sulfate $ZnSO_4 \cdot 7H_2O$ | 2400 |
| Manganese sulfate $MnSO_4 \cdot H_2$) | 800 |
| Cobalt nitrate $Co(NO_3)_2 \cdot 6H_2O$ | 15 |
| Sodium molybdate $NaMoO_4$ | 400 |
| Potassium iodide KI | 200 |
| Boric acid $H_3BO_3$ | 1000 |
| Ferric chloride $FeCl_3 \cdot 6H_2O$ | 400 |

The surface active agent which is utilized in the process of the invention can be of the cationic, anionic or nonionic type depending upon the particular micro-organism being cultivated. Thus, we may use a cationic surface active agent such as stearyl-trimethyl ammonium chloride, an anionic surface active agent such as sodium alkyl sulfates, or a nonionic surface active agent such as polyoxyethylene glycols and their ester derivatives. In a preferred embodiment of our invention utilizing a yeast such as a strain of Candida tropicalis, a nonionic surface active agent is utilized. Typical nonionic surface active agents are glycerol mono- and dilaurates, glycerol mono- and dioleates, glycerol mono- and distearates, glycerol monopalmitate, glycerol monomyristate, propylene glycol monostearate, propylene glycol monopalmitate, propylene glycol monooleate, sorbitan laurate, sorbitan mono- and tristearates, soribtan mono- and trioleates; mannitan stearates, palmitates and laurates; mono-, di- and triglycerides of fatty acids such as oleic, palmitic and stearic acids; glycerol sorbitan laurate, polyoxyethylene sorbitan palmitates, oleates, stearates and laurates; sucrose laurates, stearates, oleates and myristates; and the like.

The surface active agent is employed only during the start up of the continuous process. When so used, the surface active agent comprises about 0.005 to about 0.05 percent by weight of the aqueous nutrient medium, preferably about 0.01 percent by weight.

Oxygen, as disclosed hereinabove, is one of the essential elements required to promote the growth of the micro-organism. While pure oxygen can be employed, we prefer for economic reasons to supply the oxygen as air. In order to effect an optimum growth of the micro-organism, the air should be finely dispersed through the substrate preferably with agitation at a rate sufficient to form a vortex in the liquid. Depending upon the design of the fermenter, various air introducing means can be used including a single orifice, half and full ring types with openings for air discharge directed upwardly and/or downwardly, and sintered glass percolator types with various impellers for lifting air. Impellers, when employed, can be rotated at rates from 200 to 1,000 rpm or more, the particular rate being chosen to create a vortex in the liquid. Regardless of the type of air introduction means, operation should be such as to avoid excessive foaming since foaming tends to entrap the micro-organism and remove it from the source of soluble nutrients required in its growth. While the amount of air employed depends somewhat on the size and design of the fermenter, good results can be obtained in 14-liter fermenters containing 7 liters of brew when employing sterile air at rates of 2 to 10 liters per minute.

The optimum temperature for the growth of the micro-organism in the start up phase of the process and in the continuous phase is dependent upon the particular organism employed but will usually be within the range of about 25° to about 40° C. When using a strain of Candida tropicalis the preferred temperature range is about 25° to about 35° C.

Micro-organisms grown under controlled conditions in the presence of variable amounts of all nutrients required to support growth and under environmental conditions favorable to growth typically grow in a characteristic pattern which may be designated as follows:

1. Initial stationary phase — In this phase, the number of micro-organisms remains constant.

2. Lag phase — During this period, the rate of multiplication increases with time.

3. Logarithmic growth phase — The rate of multiplication remains constant; the generation time is the same throughout the period.

4. Negative growth phase — During this phase, the rate of multiplication decreases and the average generation time increases. The organisms continue to increase in number, but at a slower rate than during the logarithmic phase.

5. Maximum stationary phase — The number of living organisms remains constant, i.e., the death rate equals the rate of reproduction.

6. Accelerated death phase — The number of micro-organisms declines with increasing rapidity. The average rate of death increases to a maximum.

7. Logarithmic death phase — In this period, the rate of death is constant.

According to the present invention the surface active agent is added at the beginning of phase "3," i.e., the logarithmic growth phase. When the cell concentration reaches a maximum in the logarithmic growth phase, the process is placed in continuous operation and no additional surface active agent is employed. Notwithstanding the absence of added surface active agent, the process continues while maintaining the cell concentration at the maximum reached during the logarithmic growth phase. When the process is in continuous operation, a fraction containing the desired micro-organism is continuously removed from the fermentation mass. The desired micro-organism is then separated from the withdrawn fraction by conventional means such as by centrifuging. Thereafter, the micro-organism is washed one to three times with tap water and finally dried under conditions sufficiently mild to avoid autolysis but under conditions sufficiently severe to assure recovery of a non-viable micro-organism containing not more than about 10 percent moisture, usually about 3 to about 5 percent moisture. With bacteria, the drying temperature may be as high as 100° C. The drying temperature for most yeasts to insure the recovery of non-viable cells in an oven is within the range of about 50° to about 75° C. If spray drying is employed, the temperature of the dryer may be in the order of about 150° C. without adversely affecting the quality of the yeast. In drum drying a strain of *Candida tropicalis*, we have recovered non-viable cells by employing a drying temperature of about 120° C.

In accordance with our invention, the aqueous nutrient medium, surface active agent and hydrocarbon, in the fermenter, is initially seeded with about 0.5 to about 3 grams of micro-organism per liter of aqueous nutrient medium. Culturing is initiated and continued under aerobic conditions until the cell concentration increases to about 15 to about 25 grams per liter in the logarithmic growth phase. When the cell concentration reaches a maximum within the range of about 15 to about 25 grams per liter, continuous aerobic culturing is initiated and thereafter continued in the presence of aqueous nutrient medium and hydrocarbon in the absence of added surface active agent, the cell concentration in the brew withdrawn continuing at said maximum of about 15 to about 25 grams per liter. It makes no difference whether surface active agent is present during the continuous culturing. The cell concentration is maintained at that amount reached just prior to initiating the continuous culturing. When the above procedure is repeated without a surface active agent in the initial step of the process, the cell density reaches a maximum of only about 10 grams per liter. In this event, if continuous culturing is initiated, the cell density is maintained at about 10 grams per liter. The advantage of employing a surface active agent just prior to the initiation of continuous culturing is thus self-evident.

The invention will be further illustrated by way of the following examples. In the following examples we have utilized an atypical strain of *Candida tropicalis*, i.e., *Candida tropicalis*, strain CS–9–5. This yeast was isolated through an enrichment culture procedure from oil-soaked soil adjacent to operating oil wells located in Pennsylvania. The micro-organism was characterized and identified in accordance with the classification in "The Yeasts" by J. Lodder and N. J. W. Kreger-Van Rij, North Holland Publishing Co. Amsterdam, 1952, Interscience Publishers, Inc., New York. The micro-organism was found to be identical in all physiological characteristics with *Candida tropicalis* (ATCC 1410) obtained from the American Type Culture Collection, Washington, D. C. Morphologically, the micro-organism which we employed was similar to *Candida tropicalis* (ATCC 1410), differing primarily in cell size. The cells of the strain of *Candida tropicalis* (CS–9–5) were smaller than the cells of the type culture.

Example I is an illustration of the process of the invention. It should be understood that Example I is by way of illustration only and is not intended to limit the scope of the invention. Example II is for comparison purposes and is not a process of the invention.

EXAMPLE I

Seven liters of an aqueous mineral nutrient medium and 0.7 grams of polyoxyethylene sorbitan monooleate are introduced into a 14 liter glass fermenter equipped with a stainless steel head assembly. The head assembly contains ports for the addition of nutrients and removal of samples, an agitator shaft, an air sparger line, baffles, ports for glass pH electrodes and a thermometer well. The nutrient medium introduced into the fermenter has the following composition:

| | Grams |
|---|---|
| Potassium phosphate $KH_2PO_4$ | 3 |
| Magnesium sulfate $MgSO_4 \cdot 7H_2O$ | 1 |
| Sodium nitrate $NaNO_3$ | 0.07 |
| Calcium nitrate $Ca(NO_3)_2 \cdot 4H_2O$ | 0.08 |
| Ammonium sulfate $(NH_4)_2SO_4$ | 0.66 |
| Sulfuric acid, concentrated (93% $H_2SO_4$) | 0.291 |

| | Micrograms |
|---|---|
| D-Biotin | 5 |
| Copper Sulfate $CuSO_4 \cdot 5H_2O$ | 240 |
| Zinc sulfate $ZnSO_4 \cdot 7H_2O$ | 2400 |
| Manganese sulfate $MnSO_4 \cdot H_2O$ | 800 |
| Cobalt nitrate $Co(NO_3)_2 \cdot 6H_2O$ | 15 |
| Sodium molybdate $NaMoO_4$ | 400 |
| Potassium iodide KI | 200 |
| Boric acid $H_3BO_3$ | 1000 |
| Ferric chloride $FeCl_3 \cdot 6H_2O$ | 400 |
| Distilled water — Sufficient to form 1 liter of solution | |

The fermenter is placed in a water bath which is adjusted to maintain the fermentation medium at 30° ± 2° C. The fermenter is equipped with impellers connected to a drive mechanism capable of rotating the impellers at rates up to 1,000 rpm. The air which is introduced into the fermenter through the sparger is passed through a stainless steel filter tube packed with Pyrex glass wool to remove any particles of dust as well as any air-borne micro-organisms.

The fermenter which contains the seven liters of nutrient medium is then inoculated with 51.9 grams of wet (73 percent moisture) yeast of the strain *Candida tropicalis* (CS–9–5). The cellular density of the yeast in the fermenter is thus about 14 g of dry matter per 7 liters or about 2 g per liter. The $C_9$–$C_{13}$ normal paraffin mixture utilized has a normal paraffin distribution substantially as follows:

| n-Paraffin | Weight Percent |
|---|---|
| $C_9$ | trace |
| $C_{10}$ | 6.8 |
| $C_{11}$ | 35.2 |
| $C_{12}$ | 32.1 |
| $C_{13}$ | 25.8 |

The initial propagation is conducted for 10 hours at about 30° C. with an aeration rate of about 7 liters per minute at an impeller speed of about 700 rpm. During this 10 hour period a total of 180 ml of the above-described $C_9$–$C_{13}$ n-paraffin mixture are added incrementally. During the first hour 5.2 ml of the n-paraffin mixture are added. During each subsequent hour, the amount of n-paraffin mixture added is increased by 26 percent over the amount added in the previous hour, i.e., 6.5 ml the second hour, 8.2 ml the third hour, etc. At hourly intervals during the 10 hours of the initial propagation, a total of 48 ml of ammonium hydroxide containing about 210 mg of nitrogen per ml are added incrementally. During the first hour 1.4 ml of the ammonium hydroxide are added. During each subsequent hour, the amount of ammonium hydroxide added is increased by 26 percent over the amount added in the previous hour, i.e., 1.74 ml the second hour, 2.2 ml the third hour, etc. The total amount of nitrogen added to the fermenter during the 10 hour period is about 10.08 grams. The pH of the fermentation mass is maintained at about 3 during the initial propagation by the addition of the ammonium hydroxide. At the end of the 10 hour initial propagation period the cellular density is about 20 g of dry matter per liter and the protein content about 1 percent by weight.

At the end of the initial propagation period, continuous culturing is initiated. During the continuous culturing, the aqueous nutrient medium is added at a rate of about 1,600 ml/hr. The $C_9$–$C_{13}$ n-paraffin mixture is added at a rate of about 46 ml/hr. The aeration rate is maintained at about 7 liters per minute at an impeller speed of about 700 rpm. Ammonium hydroxide is introduced to maintain a pH of about 3. The temperature is maintained at about 30° C. An effluent fraction is continuously removed from the fermenter, the cell concentration being about 20 g per liter. Upon separating and drying the yeast from the fraction thus obtained, a product comprising an atypical strain of *Candida tropicalis* is obtained.

EXAMPLE II

The procedure of Example I is repeated except that no surface active agent is employed during the initial propagation. In this instance, the cellular density at the end of the initial propagation is about 10 g of dry matter per liter. When subjected to continuous culturing, the subsequent effluent fraction has a cell concentration of about 10 g per liter. Thus, the yield when no surface active agent is employed during the initial propagation is only about 50 percent of that obtained when using the process of the invention.

The make-up of *Candida tropicalis* (CS–9–5) obtained in the process of the present invention may vary slightly from one fermentation to another. A typical chemical composition of the dried product is as follows:

| | *Candida tropicalis* (CS–9–5) Percent by weight |
|---|---|
| Moisture | 2.9 |
| Total nitrogen | 7.68 |
| Crude protein | 48.0 |
| Albuminoid nitrogen | 6.58 |
| Nitrogen as Amino acids | 41.1 |
| Ash | 9.7 |
| Fat | 1.5 |
| Fiber | 8.7 |

Typical analyses for the amino acid distribution in the protein fraction of *Candida tropicalis* (CS–9–5) are as follows:

| Amino Acids | *Candida tropicalis* (CS–9–5) Percent by weight of Protein fraction |
|---|---|
| Lysine | 9.04 |
| Histidine | 2.18 |
| Arginine | 4.91 |
| Aspartic Acid | 11.34 |
| Threonine | 6.52 |
| Serine | 5.85 |
| Glutamic Acid | 14.09 |
| Proline | 4.25 |
| Glycine | 5.00 |
| Alanine | 6.66 |
| Cystine | 1.20 |
| Valine | 5.03 |
| Methionine | 1.54 |
| Isoleucine | 4.92 |
| Leucine | 8.15 |
| Tyrosine | 3.80 |
| Phenylalanine | 4.90 |
| Tryptophan | 1.52 |

While our invention has been described with reference to various specific examples and embodiments, it will be understood that the invention is not limited to such examples and embodiments and may be variously practiced within the scope of the claims hereinafter made.

We claim:

1. In a continuous process for cultivating a hydrocarbon-consuming micro-organism, the improvement which comprises initiating the propagation of the micro-organism by introducing a hydrocarbon-consuming micro-organism at an active fermentation temperature into a micro-organism growth-supporting mixture comprising an aqueous nutrient medium, a surface active agent which comprises about 0.005 to about 0.05 percent by weight of the aqueous nutrient medium, a hydrocarbon and a gas containing free oxygen, said mixture initially containing about 0.5 to about 3 grams of micro-organism per liter; cultivating the hydrocarbon-consuming micro-organism in said mixture until a maximum cell concentration of the micro-organism is obtained under logarithmic growth, said maximum cell concentration being about 15 to about 25 grams per liter; and thereafter continuously cultivating the hydrocarbon-consuming micro-organism at a cell concentration of about 15 to about 25 grams per liter in the presence of an aqueous nutrient medium, a hydrocarbon and a gas containing free oxygen in the absence of added surface active agent.

2. The process of claim 1 wherein said micro-organism is a bacterium.

3. The process of claim 1 wherein said micro-organism is a yeast.

4. In a continuous process for cultivating a hydrocarbon-consuming micro-organism, the improvement which comprises initiating the propagation of the micro-organism by introducing a hydrocarbon-consuming micro-organism at an active fermentation temperature into a micro-organism growth-supporting mixture comprising an aqueous nutrient medium, a surface active agent which comprises about 0.005 to about 0.05 percent by weight of the aqueous nutrient medium, a hydrocarbon and a gas containing free oxygen, said mixture initially containing about 0.5 to about 3 grams of micro-organism per liter; cultivating the hydrocarbon-consuming micro-organism in said mixture until a maximum cell concentration of the micro-organism is obtained under logarithmic growth, said maximum cell concentration being about 15 to about 25 grams per liter; and thereafter continuously cultivating the hydrocarbon-consuming micro-organism at a cell concentration of about 15 to about 25 grams per liter in the presence of an aqueous nutrient medium, a hydrocarbon and a gas containing free oxygen in the absence of added surface active agent; continuously separating a micro-organism fraction from the fermentation mass; and recovering the micro-organism from said fraction.

5. In a continuous process for cultivating a hydrocarbon-consuming yeast, the improvement which comprises initiating the propagation of the yeast by introducing a hydrocarbon-consuming yeast at an active fermentation temperature of about 25° to about 40° C. into a yeast growth-supporting mixture comprising an aqueous nutrient medium, a surface active agent which comprises about 0.005 to about 0.05 percent by weight of the aqueous nutrient medium, a hydrocarbon and a gas containing free oxygen, said mixture initially containing about 0.5 to about 3 grams of yeast per liter; cultivating the hydrocarbon-consuming yeast in said mixture until a maximum cell concentration of the yeast is obtained under logarithmic growth, said maximum cell concentration being about 15 to about 25 grams per liter; thereafter continuously cultivating the hydrocarbon-consuming yeast at a cell concentration of about 15 to about 25 grams per liter in the presence of an aqueous nutrient medium, a hydrocarbon and a gas containing free oxygen in the absence of added surface active agent; continuously separating a yeast-containing fraction from the fermentation mass; and recovering the yeast from said fraction.

6. The process of claim 5 wherein the yeast is of the family Cryptoccaceae.

7. The process of claim 5 wherein the yeast is of the subfamily Cryptococcoideae.

8. The process of claim 5 wherein the yeast is of the genus *Candida*.

9. The process of claim 5 wherein the yeast is of the strain *Candida tropicalis*.

10. The process of claim 5 wherein the yeast is *Candida tropicalis*, CS–9–5.

11. The process of claim 5 wherein the hydrocarbon is a liquid petroleum fraction consisting essentially of a mixture of straight chain hydrocarbons.

12. The process of claim 11 wherein the liquid petroleum fraction is a mixture of $C_9$ to $C_{13}$ normal paraffins.

13. The process of claim 5 wherein the pH of the aqueous nutrient medium is within the range of about 1.5 to about 8.

14. The process of claim 5 wherein the oxygen-containing gas is air.

15. In a continuous process for cultivating a hydrocarbon-consuming yeast of the strain *Candida tropicalis*, the improvement which comprises initiating the propagation of the yeast by introducing *Candida tropicalis* at a temperature of about 28° to about 32° C. into a yeast growth-supporting mixture comprising an aqueous nutrient medium whose pH is maintained within the range of about 3 to about 5, a surface active agent which comprises about 0.005 to about 0.05 percent by weight of the aqueous nutrient medium, a hydrocarbon feedstock comprising a mixture of $C_9$ to $C_{13}$ normal paraffins and air, said growth-supporting mixture initially containing about 0.5 to about 3 grams of yeast per liter; cultivating the *Candida tropicalis* in said growth-supporting mixture until a maximum cell concentration of the yeast is obtained under logarithmic growth, said maximum cell concentration being about 15 to about 25 grams per liter; thereafter continuously cultivating the *Candida tropicalis* at a cell concentration of about 15 to about 25 grams per liter in the presence of an aqueous nutrient medium whose pH is maintained within the range of about 3 to about 5, a hydrocarbon feedstock comprising a mixture of $C_9$ to $C_{13}$ normal paraffins and air in the absence of added surface active agent; continuously separating a *Candida tropicalis* fraction from the fermentation mass; and recovering *Candida tropicalis* from said fraction.

16. The process of claim 15 wherein the surface active agent is a nonionic surface active agent.

17. The process of claim 15 wherein the surface active agent is polyoxyethylene sorbitan monooleate.

* * * * *